(No Model.) 3 Sheets—Sheet 1.
T. J. REED.
MACHINE FOR CLEANING CORN CHAFF OR CELLULOSE.
No. 472,548. Patented Apr. 12, 1892.
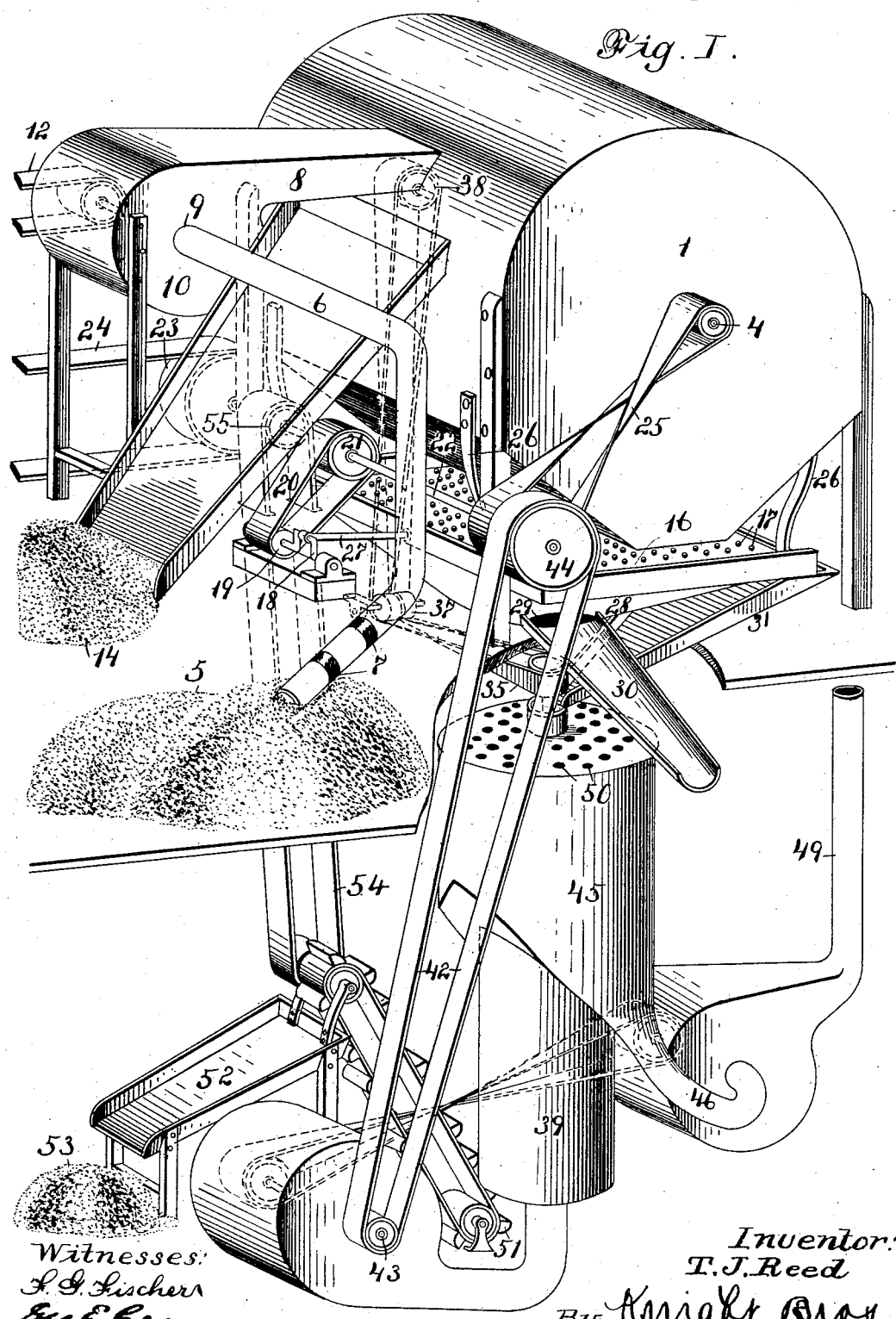
Fig. I.
Witnesses:
F. G. Fischer
Geo. E. Cram
Inventor:
T. J. Reed
By Knight Bros.
Attys.

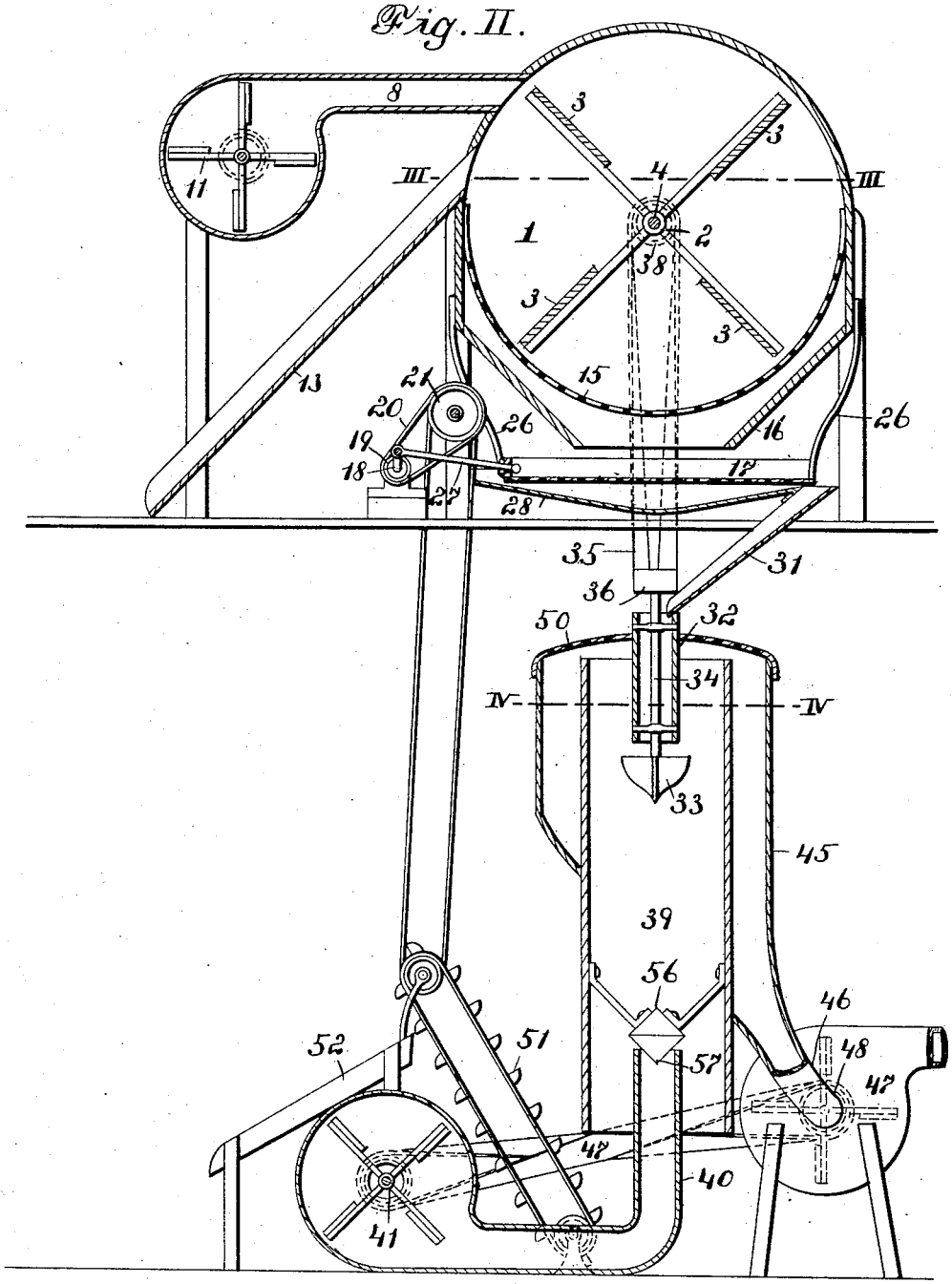

(No Model.) 3 Sheets—Sheet 3.
T. J. REED.
MACHINE FOR CLEANING CORN CHAFF OR CELLULOSE.
No. 472,548. Patented Apr. 12, 1892.
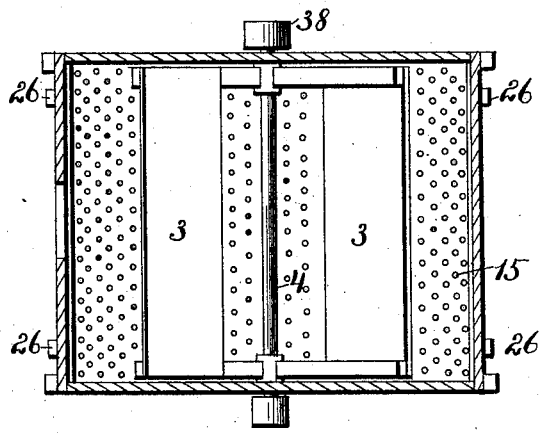
Fig. III.
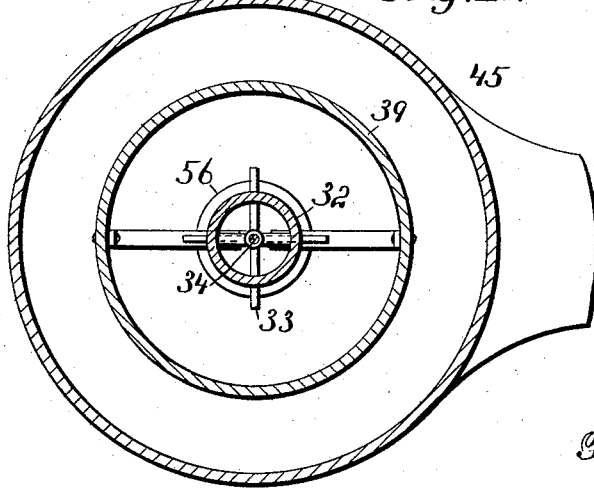
Fig. IV.
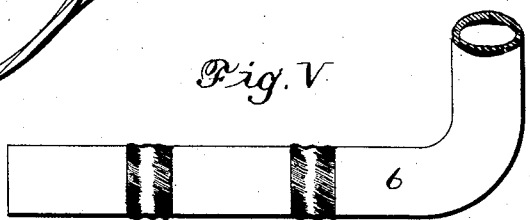
Fig. V.
Witnesses:
F. G. Fischer
Geo. E. Cure
Inventor:
T. J. Reed
By Knight Bro.
Attys.

UNITED STATES PATENT OFFICE.

THEODORE J. REED, OF LEAVENWORTH, KANSAS, ASSIGNOR TO LOUIS SCHEER, OF SAME PLACE.

MACHINE FOR CLEANING CORN-CHAFF OR CELLULOSE.

SPECIFICATION forming part of Letters Patent No. 472,548, dated April 12, 1892.

Application filed April 14, 1891. Serial No. 388,872. (No model.)

*To all whom it may concern:*

Be it known that I, THEODORE J. REED, of Leavenworth, in the county of Leavenworth and State of Kansas, have invented certain new and useful Improvements in Machines for Cleaning Corn-Chaff or Cellulose, of which the following is a full, clear, and exact description, reference being had to the accompanying drawings, which form a part of this specification.

My invention relates to a certain new and useful device for separating the downy or finer particles of corn-chaff or cellulose from the coarser particles, dust, &c., corn-chaff or cellulose being that light or fluffy material that connects the grain of corn with the cob, and which is detached from the grain and cob as the corn is shelled, and which I desire to use in the place of feathers and other like articles for the purpose of filling mattresses, pillows, cushions, &c.

My invention consists in certain features of novelty hereinafter described, and pointed out in the claims.

Figure I is a perspective of my improved device. Fig. II is a vertical section of the same. Fig. III is a transverse section taken on line III III, Fig. II. Fig. IV is a transverse section taken on line IV IV, Fig. II. Fig. V is an enlarged detail view of the flexible suction-tube for taking up the chaff.

Referring to the drawings, 1 represents a drum in which works a reel 2, having blades 3, said reel having its shaft 4 journaled in the drum 1. The crude chaff, as it comes from the corn-sheller, is placed in a pile, as shown at 5, a suction-tube 6 extending down to the same, said suction-tube having flexible portions 7, whereby the end of the same can be moved in any direction to accommodate itself to the pile of chaff. The tube 6 connects with an inclosed spout 8, as shown at 9, said spout having an enlarged portion 10, in which is journaled a fan 11, said fan drawing the chaff up through the tube 6 and discharging it out through the spout 8 into the drum 1. The fan 11 is operated by a belt 12, which may connect with a suitable power device. The chaff in its crude state being discharged into the drum is rapidly revolved therein by the reel 2, the blades 3 of the same throwing the coarser particles out through a chute 13, from whence they are discharged into a pile, as shown at 14, and can be used for firing the furnace in order to operate the device, or may be used at other points for heating purposes, if so desired.

The lower portion of the drum 1 is provided with a screen or sieve, as shown at 15. The finer particles of the chaff pass through this screen and are discharged into a hopper 16, from whence the particles are discharged onto a vibrating screen 17, said screen being of finer mesh than the screen 15. The screen 17 is vibrated by a crank 18, having a pulley 19 on its shaft, said pulley being operated by a belt 20, which in turn is operated by the pulley 21, located on a shaft 22, the shaft 22 being provided with a pulley 23 on one of its ends, and a belt 24 connecting said pulley with a suitable power device. (Not shown.) The shaft 22 also rotates the reel 2 in the drum 1 by means of a belt 25, connected with the shaft 4 of said reel.

The vibrating screen 17 is supported by springs 26 and connected with the crank 18 by means of a shaker-rod 27. As the screen 17 is vibrated the dust, sand, &c., passes out through the meshes of said screen into a hopper 28, from whence it is discharged through an opening 29 into a suitable discharge-spout 30, which may convey the dust and sand away from the machine to any desired point. The valuable parts of the chaff are discharged from the screen 17 into a chute 31, from whence it is discharged into a tube 32, having a series of radial blades 33, located near its lower end and supported by a shaft 34, said shaft and turbine being operated by a belt 35, engaging a pulley 36 on the upper end of said shaft 34, said belt 35 passing under bearing-rollers 37 and connected with one end of the shaft 4, as shown at 38, which passes through the drum 1. The purpose of the blades 33 is to scatter the chaff as it passes down through the tube 32 into a vertical drum 39, said drum being open at each of its ends.

40 represents a pipe extending up into the lower end of the vertical drum 39, for conveying a blast of air into the same, said pipe being connected with a fan 41, operated by a belt 42, which connects the shaft 43 of said fan with a pulley 44 on the shaft 22, said fan causing a blast of air to pass up through the pipe 40, meeting the chaff on the drum 39 as it is scattered by the turbine 33, said blast blowing the corn-chaff up over the upper end of the drum 39 and discharging the same into a cylinder 45, surrounding said drum, the chaff in its cleaned and merchantable shape then passing from the cylinder 45, through a pipe 46, into a chamber 47, in which is located a fan 48, which draws the chaff in from the cylinder 45 and discharges it out through a pipe 49 to any suitable or desired point. The bottom of the drum 39 being open, any heavy particles—such as sand, &c.—will drop out through the same, and any dust remaining in the chaff after it passes into the drum 39 is blown out by the blast through the pipe 40 and through a screen 50, inclosing the upper end of the cylinder 45, said screen being of such fine mesh as not to permit the chaff to pass out through the same. The dust and dirt that is discharged through the screen 50 falls down with the sand and other substances which drop through the bottom of the drum 39 into a pile, from whence it is conveyed by an elevator 51 to a chute 52, where it is discharged, as shown at 53, the elevator 51 being operated by a belt 54, which connects the same with the shaft 22, as shown at 55.

56 represents a double cone-shaped block having one of its points extending down to the mouth of the tube or pipe 40, as shown at 57, whereby the blasts of air through said pipe is deflected and distributed throughout the drum 39, for the purpose of acting on the chaff as it descends from the radial blades.

I claim as my invention—

1. The combination of a suitable drum having an agitating-reel located therein, a screen in said drum, means for supplying chaff to said drum, a vibrating screen situated beneath said drum, a chute 31 in connection with said screen, a tube 32, into which the chaff is discharged from said chute, a vertical drum 39, into which said tube extends, and a series of rotary radial blades 33 for scattering the chaff as it passes through the tube 32 into the drum 39, substantially as and for the purpose described.

2. The combination of a suitable drum, a reel located therein for agitating corn-chaff, suitable screens in connection with said drum, tube 32, drum 39, having arranged above its upper end a screen into which said tube extends, chute 31 for connecting one of the screens with said tube, series of rotary radial blades for agitating the chaff in said drum 39, a blast-pipe 40 for creating a blast in said drum, and a cone-shaped block 56 for deflecting said blast in said drum, substantially as described, and for the purpose set forth.

3. The combination of a suitable drum, a reel located therein for agitating chaff, suitable screens in connection with said drum, a drum 39, having arranged above its upper end a screen, and through which a blast is forced, the chute 31 and the tube 32 entering said drum, and a cylinder 45 surrounding said drum for conveying the chaff which is discharged from said drum into said cylinder, and having its upper end formed into a screen arranged above said drum, substantially as and for the purpose described.

4. The combination of a drum 39, means for forcing a blast through the same, means for discharging chaff into said drum, cylinder 45, having the screen 50 at its upper end and surrounding said drum, pipe 46, connecting said drum with an exhaust-fan 47, and a pipe 49 in connection with said exhaust-fan for carrying off the merchantable article of chaff or cellulose after the same is in its finished state.

5. The combination of the drum 1, a reel located therein, means for supplying chaff thereto, screens in connection with said drum, vertical drum 39, means for forcing a blast through the same, cylinder 45, screen 50, located on the upper end of said cylinder, through which dust may be discharged, said cylinder being open at its lower end for the discharge of sand and heavier particles, an elevator 51, means for operating the same, and a discharge-chute 52, into which said elevator discharges, substantially as described, and for the purpose set forth.

In testimony whereof I affix my signature in presence of two witnesses.

THEODORE J. REED.

Witnesses:
JAS. E. KNIGHT,
F. E. MULLETT.